United States Patent
Brodie et al.

(10) Patent No.: US 10,678,926 B2
(45) Date of Patent: Jun. 9, 2020

(54) IDENTIFYING SECURITY RISKS IN CODE USING SECURITY METRIC COMPARISON

(71) Applicant: International Business Machines Corporation, Armonk, NY (US)

(72) Inventors: Aharon Brodie, Givatayim (IL); Christopher V Derobertis, Hopewell Junction, NY (US); Orna Raz, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 15/401,118

(22) Filed: Jan. 9, 2017

(65) Prior Publication Data
US 2018/0198814 A1    Jul. 12, 2018

(51) Int. Cl.
*G06F 21/57* (2013.01)
*H04L 29/06* (2006.01)

(52) U.S. Cl.
CPC ........ *G06F 21/57* (2013.01); *G06F 2221/033* (2013.01); *H04L 63/1425* (2013.01); *H04L 63/1433* (2013.01)

(58) Field of Classification Search
CPC . H04L 63/1433; H04L 63/1425; G06F 21/57; G06F 2221/033
See application file for complete search history.

(56) References Cited

U.S. PATENT DOCUMENTS

| 6,219,805 | B1 * | 4/2001 | Jones | G06F 11/3616 714/25 |
| 6,651,244 | B1 * | 11/2003 | Smith | G06F 8/75 714/38.1 |
| 7,257,630 | B2 * | 8/2007 | Cole | G02B 5/3083 709/224 |
| 7,389,514 | B2 * | 6/2008 | Russell | G06F 9/466 719/315 |

(Continued)

OTHER PUBLICATIONS

M. Cova, V. Felmetsger, G. Banks and G. Vigna, "Static Detection of Vulnerabilities in x86 Executables," 2006 22nd Annual Computer Security Applications Conference (ACSAC'06), Miami Beach, FL, 2006, pp. 269-278. (Year: 2006).*

(Continued)

*Primary Examiner* — Robert B Leung
*Assistant Examiner* — Sameera Wickramasuriya
(74) *Attorney, Agent, or Firm* — Barry Blount

(57) ABSTRACT

An example system includes a processor to receive a source code and history information, wherein the history information includes a version control history or a defect history, or a combination of the version control history and the defect history. The processor is to also divide the source code into security-related components and security-non-related components. The processor is to further calculate security metrics for each of the security-related components and each of the security-non-related components based on the history information. The processor is also to compare the security metrics of the security-related components with the security (Continued)

metrics of the security-non-related components. The processor is to further generate a visual representation comprising a highlighted area of concern based on the comparison.

20 Claims, 7 Drawing Sheets

(56) References Cited

U.S. PATENT DOCUMENTS

| | | | | |
|---|---|---|---|---|
| 7,487,545 B2* | 2/2009 | Hall | ............ | G06F 21/577 |
| | | | | 714/38.1 |
| 7,870,075 B1* | 1/2011 | Sabet | ............ | G06F 21/105 |
| | | | | 380/201 |
| 7,895,650 B1* | 2/2011 | Sobel | ............ | G06F 21/554 |
| | | | | 713/164 |
| 8,214,906 B2* | 7/2012 | Goddard | ............ | G06F 11/008 |
| | | | | 726/22 |
| 8,347,392 B2* | 1/2013 | Chess | ............ | G06F 21/54 |
| | | | | 717/124 |
| 8,359,655 B1* | 1/2013 | Pham | ............ | G06F 21/12 |
| | | | | 370/486 |
| 8,365,242 B2* | 1/2013 | Huo | ............ | G06F 21/10 |
| | | | | 705/50 |
| 8,732,838 B2* | 5/2014 | Medvedev | ............ | G06F 21/577 |
| | | | | 714/741 |
| 8,881,112 B2* | 11/2014 | Corsetti | ............ | G06F 11/3616 |
| | | | | 717/124 |
| 8,990,930 B2* | 3/2015 | Burrell | ............ | G06F 21/54 |
| | | | | 726/22 |
| 9,069,967 B2 | 6/2015 | Wysopal et al. | | |
| 9,176,729 B2* | 11/2015 | Mockus | ............ | G06F 8/70 |
| 9,349,111 B1* | 5/2016 | Elgarat | ............ | G06Q 10/0635 |
| 9,417,867 B2* | 8/2016 | Abuelsaad | ............ | G06F 8/70 |
| 9,448,787 B2* | 9/2016 | Rosomoff | ............ | G06F 8/70 |
| 9,921,948 B2* | 3/2018 | Zieder | ............ | G06F 8/60 |
| 9,946,633 B2* | 4/2018 | Atyam | ............ | G06F 11/3616 |
| 10,089,463 B1* | 10/2018 | Katz | ............ | G06F 21/50 |
| 2005/0216898 A1* | 9/2005 | Powell, Jr. | ............ | G06F 8/36 |
| | | | | 717/141 |
| 2013/0205398 A1* | 8/2013 | Kalman | ............ | G06F 21/577 |
| | | | | 726/25 |
| 2013/0212479 A1* | 8/2013 | Willis | ............ | G06Q 10/10 |
| | | | | 715/736 |
| 2014/0033176 A1* | 1/2014 | Rama | ............ | G06F 11/3688 |
| | | | | 717/124 |
| 2015/0100940 A1* | 4/2015 | Mockus | ............ | G06F 8/70 |
| | | | | 717/101 |
| 2015/0212928 A1* | 7/2015 | Gounares | ............ | G06F 11/3664 |
| | | | | 717/125 |
| 2017/0078315 A1* | 3/2017 | Allen | ............ | G06F 16/285 |

OTHER PUBLICATIONS

G. Peterson, "Introduction to identity management risk metrics," in IEEE Security & Privacy, vol. 4, No. 4, pp. 88-91, Jul.-Aug. 2006. (Year: 2006).*

Awad A. Younis et al., "Using Attack Surface Entry Points arid Reachability Analysis to Assess the Risk of Software Vulnerability Exploitability", High-Assurance Systems Engineering (HASE), 2014 IEEE 15th International Symposium on Jan. 9-11, 2014.

* cited by examiner

100

200

300

IDENTIFYING SECURITY RISKS IN CODE USING SECURITY METRIC COMPARISON

BACKGROUND

The present techniques relate to identifying security risks. More specifically, the techniques relate to identifying security risks in code using a security metric comparison.

SUMMARY

According to an embodiment described herein, a system can include a processor to receive a source code and history information. The history information can include a version control history or a defect history, or a combination of the version control history and the defect history. The processor can also further divide the source code into security-related components and security-non-related components. The processor can also calculate security metrics for each of the security-related components and each of the security-non-related components based on the history information. The processor can further compare the security metrics of the security-related components with the security metrics of the security-non-related components based on the history information. The processor can also further generate a visual representation comprising a highlighted area of concern based on the comparison.

According to another embodiment described herein, a method can include receiving, via a processor, a source code and history information. The history information can include a version control history or a defect history, or a combination of the version control history and the defect history. The method can also further include dividing, via the processor, the source code into security-related components and security-non-related components. The method can also include calculating, via the processor, security metrics for each of the security-related components and each of the security-non-related components based on the history information. The method can include comparing, via the processor, the security metrics of the security-related components with the security metrics of the security-non-related components. The method can also further include generating, via the processor, a visual representation comprising a highlighted area of concern based on the comparison.

According to another embodiment described herein, a computer program product for identifying security risks in code can include computer-readable storage medium having program code embodied therewith. The computer readable storage medium is not a transitory signal per se. The program code is executable by a processor to cause the processor to receive a source code, a version control history, and a defect history. The program code can also cause the processor to divide the source code into security-related components and security-non-related components. The program code can also cause the processor to calculate security metrics for each of the security-related components and each of the security-non-related components based on the version control history and the defect history. The program code can also cause the processor to compare the security metrics of the security-related components with the security metrics of the security-non-related components. The program code can also cause the processor to also further generate a visual representation comprising a highlighted area of concern based on the comparison.

DETAILED DESCRIPTION

Figure 1:
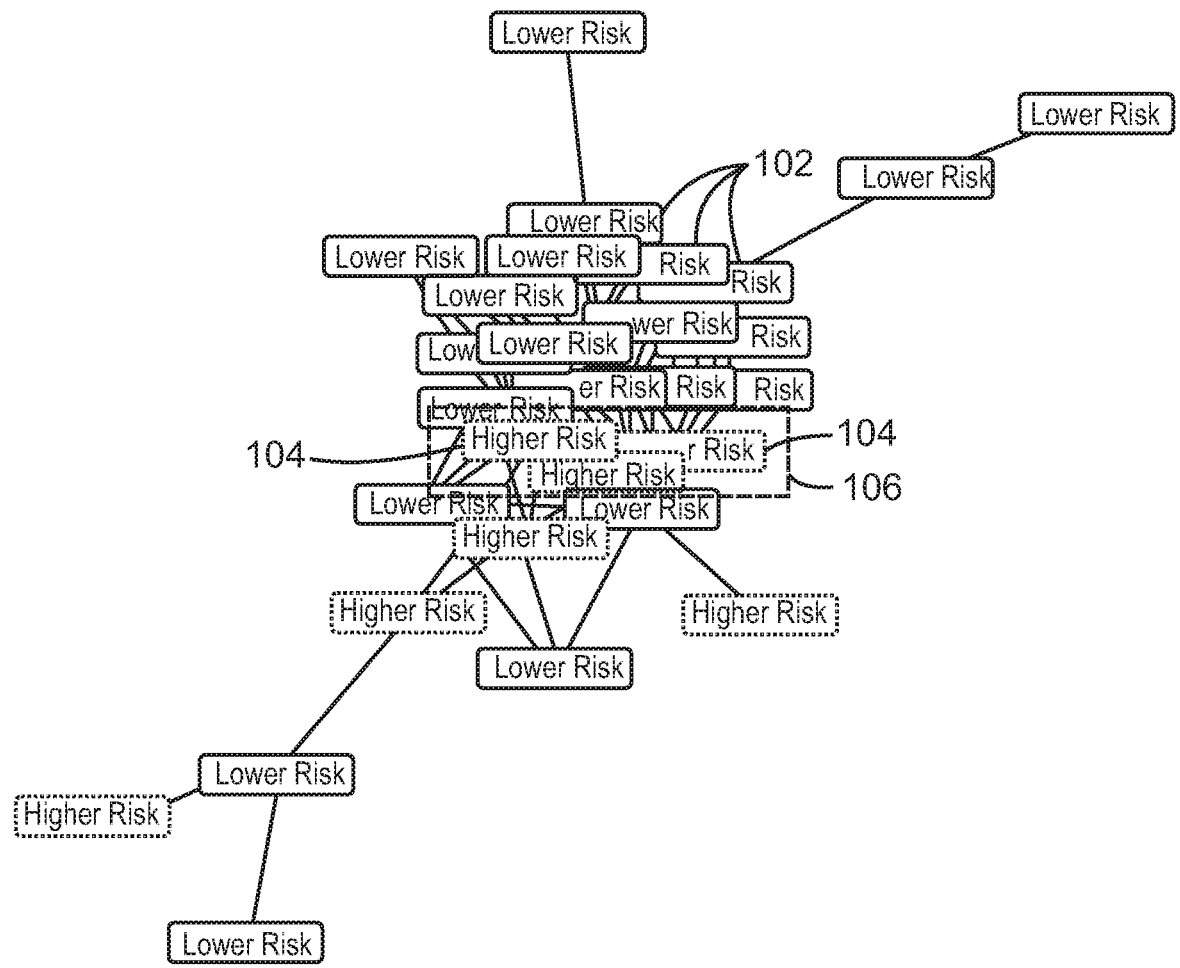
FIG. 1 is a block diagram of an example visual representation identifying security risks in code from a non-security point of view.

Identifying security risky code areas is a very challenging task in targeting security improvement activities. Traditional risk analysis models produce results primarily based on the historical statistical data of source code or through existing known coding risk factors. For example, a risk analysis model based on historical statistical data may detect a total quantity of defects found in the system, or total number of code changes, and then sort the components based on components with "the most" defects to the least defects, or most changes to the least changes. In another example, a risk analysis model using existing known coding risk factors may be a source code scanner that looks for common risks such as those published online in top 10 or top 25 lists, and common security issues in programming errors that may be language specific, among other types of common risks.

However, historical statistical data only informs based on reported defects, or a total number of changes. Reported defects may thus be risks that already have been found and not indicators of what risks might still exist. Likewise, changed code that does not also have associated defect data does may not be indicated as a potential security issue. Thus, unless there is a security defect to indicate security risk, defect counts and changed code counts may not be able to inform all possible potential security issues. Moreover, source code security scanning may only identify known security issues, and only after false positives have been eliminated from consideration. Additionally, security source code scans may not inform on the holistic security posture of a system because scanning is applied at a very atomic level. For example, a single command, a single library, or a single module, etc., may be individually scanned for security risks. Security source code scans may be effective at finding well understood or known security risks, but may have no means for informing about the security risks of system in which the single item resides.

According to embodiments of the present techniques a processor may receive a source code and history information. The history information can include a version control history or a defect history, or a combination of the version control history and the defect history. The processor may divide the source code into security-related components and security-non-related components. For example, the processor may divide the source code into security-related components and security-non-related components by marking code elements as security-related components based on one or more static detectors of known vulnerabilities, based on a received list of security-related code areas to be marked as security-related components, based on the defect history, or based on an affected components analysis. As used herein, a code element can include a directory, a file, a function, a class, and the like. The processor may also calculate security metrics for each of the security-related components and each of the security-non-related components. For example, the security metrics can be calculated based on the version control history, the defect history, or both. In some examples, the security metrics can include a quantity of security-related defects, a quantity of defects, a quantity of code changes, or any combination thereof. The processor may further compare the security metrics of the security-related components with the security metrics of the security-non-related components. The processor may then generate a visual representation comprising a highlighted area of concern based on the comparison. In some examples, the processor may then make one or more recommendations based on the comparison. For example, the processor may recommend increased security skill training for the security-non-related components, increased or improved security testing, increased or improved security source code scanning, tool improvements. In some examples, the processor may recommend review of quality controls in security code, review of security skills in a security development team, change of management processes for security code, or increased review of proposed security changes. Thus, the present techniques may enable code reviewers to focus on potentially problematic areas of code. The present techniques may also be able to make appropriate recommendations for action based on detected security risks. Thus, the techniques may enable improved security testing and analysis resulting in improved source code. In addition, the present techniques may enable previously unknown security risks to be detected and resolved before they become widely known. Furthermore, the techniques provide insight to, and inform, designers, developers, and security analysts on new patterns that may have been previously unrecognized or unseen in the vastness of a code and previously unrelated dimensions of data.

In some scenarios, the techniques described herein may be implemented in a cloud computing environment. As discussed in more detail below in reference to at least FIGS. 4, 5, and 6, a computing device configured to identify security risks in code using a security metric comparison may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 1 is a block diagram of an example visual representation identifying security risks in code from a non-security point of view. The visual representation is generally referred to using the reference number 100 and can be generated using the computing device 400 of FIG. 4 below using the method 300 of FIG. 3 below.

The example visual representation 100 includes blocks representing changes to code. In some examples, the blocks may represent new or added code. For example the new or added code may be new logic, additional conditionals, new routines, etc. In some examples, the blocks may represent code that has been removed. For example, the removed code may be response codes that are no longer supported. In some examples, the blocks may represent modifications to existing code. For example, the modification may be a loop counter that has changed. The blocks are divided into blocks including lower risk changes 102 and higher risk changes 104. For example, lower risk changes 102 may indicate low severity risks and low quantity of defects found, or a small quantity or volume of changes to code. The distance between block 102, 104 may indicate relation between the changes. For example, overlapping blocks may indicate that the changes are directly related to each other. In some examples, higher risk changes 104 may indicate high severity and high quantity of defects found, or high quantity or volume of changes to code. The visual representation 100 further includes a highlighted area 106 indicated by a box with a dotted lined representing a potential contamination problem.

In the example visual representation 100, a problem clustering and potential additional problem contamination in a component is shown from a non-security point of view. For example, the representation 100 does not take into account additional information that affects whether an alert could actually indicate a weakness, such as control and data flow in FIG. 2 below. In some examples, the blocks can be categorized into lower risk changes 102 or higher risk changes based on received historical information. For example, the historical information can include defect data regarding defect severity and/or quantity and/or whether or not a defect is a security-related defect. The historical information can also include change data regarding the size of changes, their code complexity, and/or whether the change touches security-sensitive code. The division into security-sensitive and security-non-sensitive is not used per-se here. In some examples, the highlighted area 106 can indicate a potential contamination of surrounding related lower risk changes 102 by the clustered higher risk changes 104. In some examples, the visual representation 100 may further include instructions to inspect the clustered higher risk changes 104 in the highlighted area 106 to ensure that the higher risk changes 104 do not create higher risks in the surrounding lower risk changes 102.

It is to be understood that the block diagram of FIG. 1 is not intended to indicate that the visual representation 100 is to include all of the components shown in FIG. 1. Rather, the visual representation 100 can include fewer or additional components not illustrated in FIG. 1 (e.g., additional code changes, highlighted areas, clusters, etc.). For example, the visual representation 200 may also include one or more recommendations as discussed in greater detail with respect to FIG. 3 below. In some examples, the lower and higher risk changes can be indicated by color. For example, lower risk changes below a threshold risk level can be indicated using the color blue and higher risk changes above a threshold risk level can be indicated using the color red.

Figure 2:
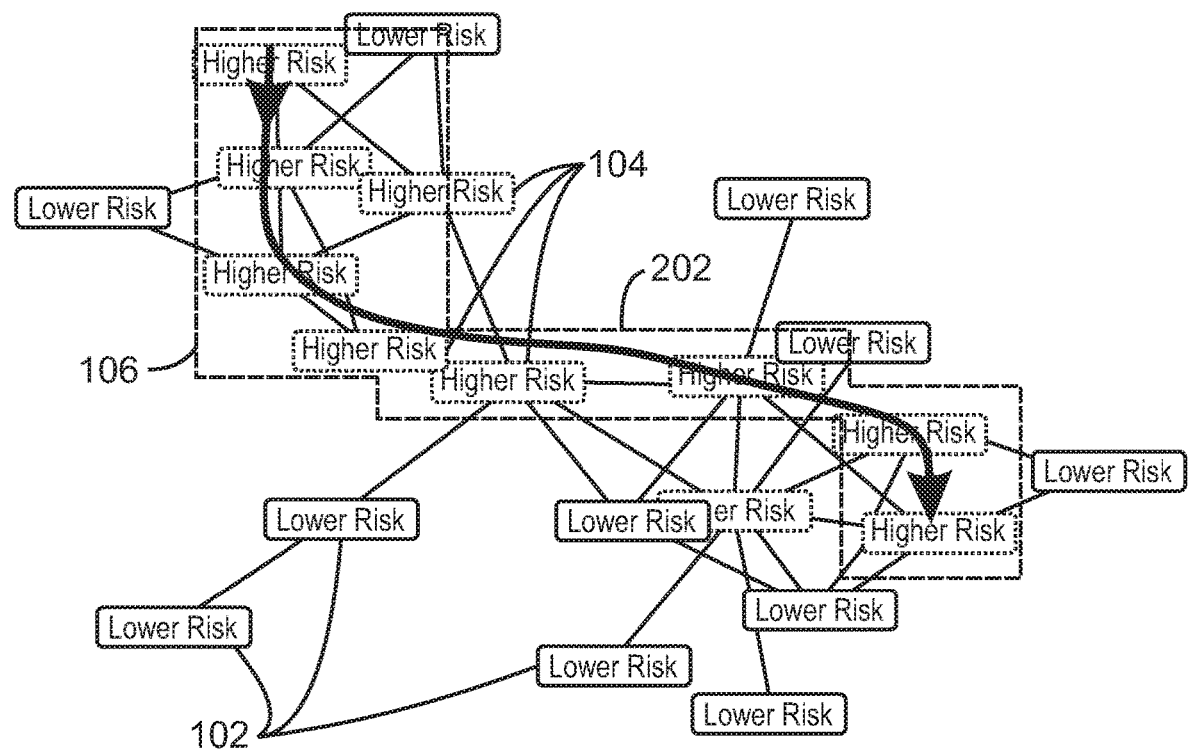
FIG. 2 is a block diagram of another example visual representation identifying security risks in code from a security point of view.

FIG. 2 is a block diagram of another example visual representation identifying security risks in code from a security point of view. The system visual representation can be generated by any suitable computing device, such as the computing device 400 of FIG. 4, using the method 300 of FIG. 3 below.

As shown in FIG. 2, the visual representation 200 similarly includes blocks representing changes to code, including low risk changes 102 and higher risk changes 104. The visual representation 200 further includes a highlighted area 106 including several boxes within the dotted line boundary indicating potential problems meriting further examination. In addition, the visual representation 200 includes a detected chain 202 of relationships between higher risk changes 104.

The visual representation 200 of FIG. 2 indicates problem clustering and potential hidden workflow issues and risks, from a security point of view. For example, the representation 200 may take into account additional information that may affect whether an alert actually indicates a weakness, such as control and data flow. In some examples, a chain 202 of higher risk changes 104 may warrant closer inspection to make sure that the chain 202 cannot be exploited. Thus, the visual representation 200 may highlight connected higher risk changes 104 along the chain 202 for closer inspection. For example, a reviewer may then determine whether a feature may be exploited at each higher risk 104 change along the chain 202. Thus, rather than just analyzing individual changes for security risks, the visual representation 200 may enable a reviewer to check for security risks stemming from a chain of higher risk changes 104.

It is to be understood that the block diagram of FIG. 2 is not intended to indicate that the visual representation 200 is to include all of the components shown in FIG. 2. Rather, the visual representation 200 can include fewer or additional components not illustrated in FIG. 2 (e.g., additional code changes, highlighted areas, clusters, etc.). For example, the visual representation 200 may also include one or more recommendations as discussed in greater detail with respect to FIG. 3 below. In some examples, the lower and higher risk changes can be indicated by color. For example, lower risk changes can be indicated using the color blue and higher risk changes can be indicated using the color red.

Figure 3:
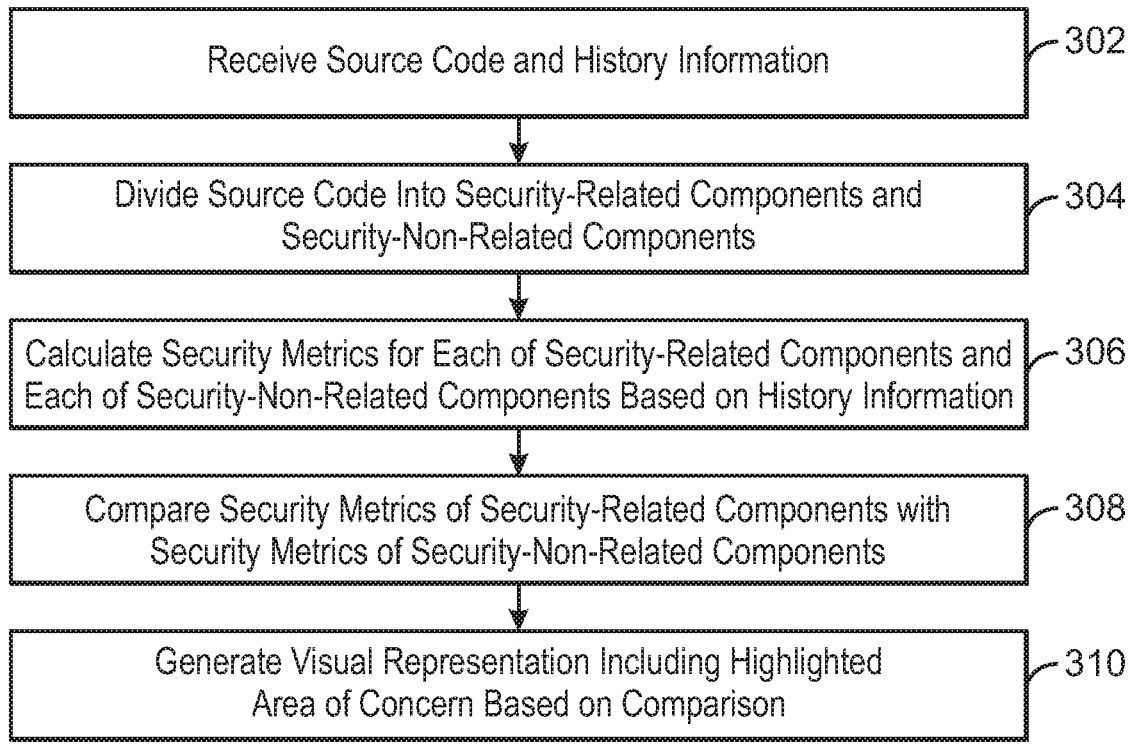
FIG. 3 is a process flow diagram of an example method that can identify security risks in code using a security metric comparison.

FIG. 3 is a process flow diagram of an example method that can identify security risks in code using a security metric comparison. The method 300 can be implemented with any suitable computing device, such as the computing device 400 of FIG. 4. For example, the method can be implemented via the processor 402 of computing device 400.

At block 302, a processor receives source code and history information. For example, the history information can include a version control history or a defect history, or both. In some examples, the version control history may include a list of changes made to the source code. In some examples, the defect history may include a list of defects previously detected and fixed in the source code. In some examples, the source code may be an application that is being developed and to be tested for security risks. In some examples, the processor also receive additional information such as a list of known vulnerabilities and weaknesses or a list of security-related code areas in the code.

At block 304, the processor divides the source code into security-related components and security-non-related components. In some examples, the processor may mark code elements that include a known vulnerability as security-related components. For example, known vulnerabilities may be received in the defect history or as a separate list. For example, the separate list may be received from community shared weaknesses and vulnerabilities databases. In some examples, the processor may mark code elements corresponding to a received list of security-related code areas as security-related components. For example, the list of security-related code areas may be received from a code developer. In some examples, the processor may mark code elements corresponding to a security-related defect as a security-related components and mark code elements modified to fix security-related defects as a security-related components. For example, the processor may detect security-related defects based on the defect history and the modifications from the defect history and the control version history. In some examples, the processor may mark a code element that is related to a security-related component as a security-related component according to a data flow, a control flow, or a joint changes history. Thus, for example, directories, files, functions, and classes related to known vulnerabilities or security-related codes areas or security-related defects can be marked as security-related components. Directories, files, functions, and classes that are not marked security-related components can be marked security-non-related components.

At block 306, the processor calculates security metrics for each of the security-related components and each of the security-non-related components based on the history information. For example, security metrics can include a quantity of security-related defects and a quantity of defects based on the defect history. The security metrics can also include a quantity of code changes based on the version control history. In some examples, the security metrics can also be weighted based on defect severity, change size, or complexity of the changed code. Thus, in some examples, each directory, file, function, and class in the source code may be assigned a security metric. In some examples, the security metrics provide numbers that can be easily computed and compared. For example, component A may be security related. Component B may be security-non-related. Component A may have had total 100 changes, whereas component B may have had 30 total changes. In addition, component A may have had 4 defects, all of them security defects. By contrast, component B may have had 2 non-security defects. In some examples, the security metric may take the number of changes and multiply that by the number of security defects. Thus, a security metric for A may be 400, while the security metric for B may be 30. In some examples, various other metrics could also be possible, using the same, different, or additional data.

At block 308, the processor compares the security metrics of the security-related components with the security metrics of the security-non-related components. For example, the processor may detect that a quantity of defects or modifications is larger in the security-related components than the security-non-related components. In some examples, the processor may also detect that a threshold number of security defects is exceeded at the security-non-related components. In some examples, based on the results of the comparison, the processor may generate one or more visual representations including one or more recommendations as described below. Thus, in the example of block 306, the security metric for component A may be much higher than the security metric for component B. The processor may therefore recommend to concentrate security risk reduction activities on component A. In another example, component B may have security related changes of defects and therefore a high security metric value. The processor may therefore send a recommendation to inspect component B from a security point of view.

At block 310, the processor generates a visual representation comprising a highlighted area of concern based on the comparison. For example, the visual representation may depict potential problems from a non-security point of view as in the example of FIG. 1 or may depict potential security risks from security point of view as in the example of FIG. 2 above. In some examples, changes to security-related components may be labeled as higher risk and changes to security-non-related components may be labeled as lower risk. In some examples, the processor may also recommend one or more actions based on the comparison. For example, in response to detecting that a threshold number of security defects is exceeded at the security-non-related components, the processor may recommend increased security skill training for the security-non-related components, increased or improved security testing, increased or improved security source code scanning, tool improvements. In some examples, in response to detecting that a quantity of defects or modifications is larger in the security-related components than the security-non-related components, the processor may recommend review of quality controls in security code, review of security skills in a security development team, change of management processes for security code, or increased review of proposed security changes. In some embodiments, the processor can modify testing of applications by removing portions of source code for testing that do not have security metrics above a threshold value.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, if security defects are detected in an open source or other vendor-provided source, then the data can be used to inform quality control requirements on software acquisition, future costs to integrate open source/vendor security fixes, etc.

Figure 4:
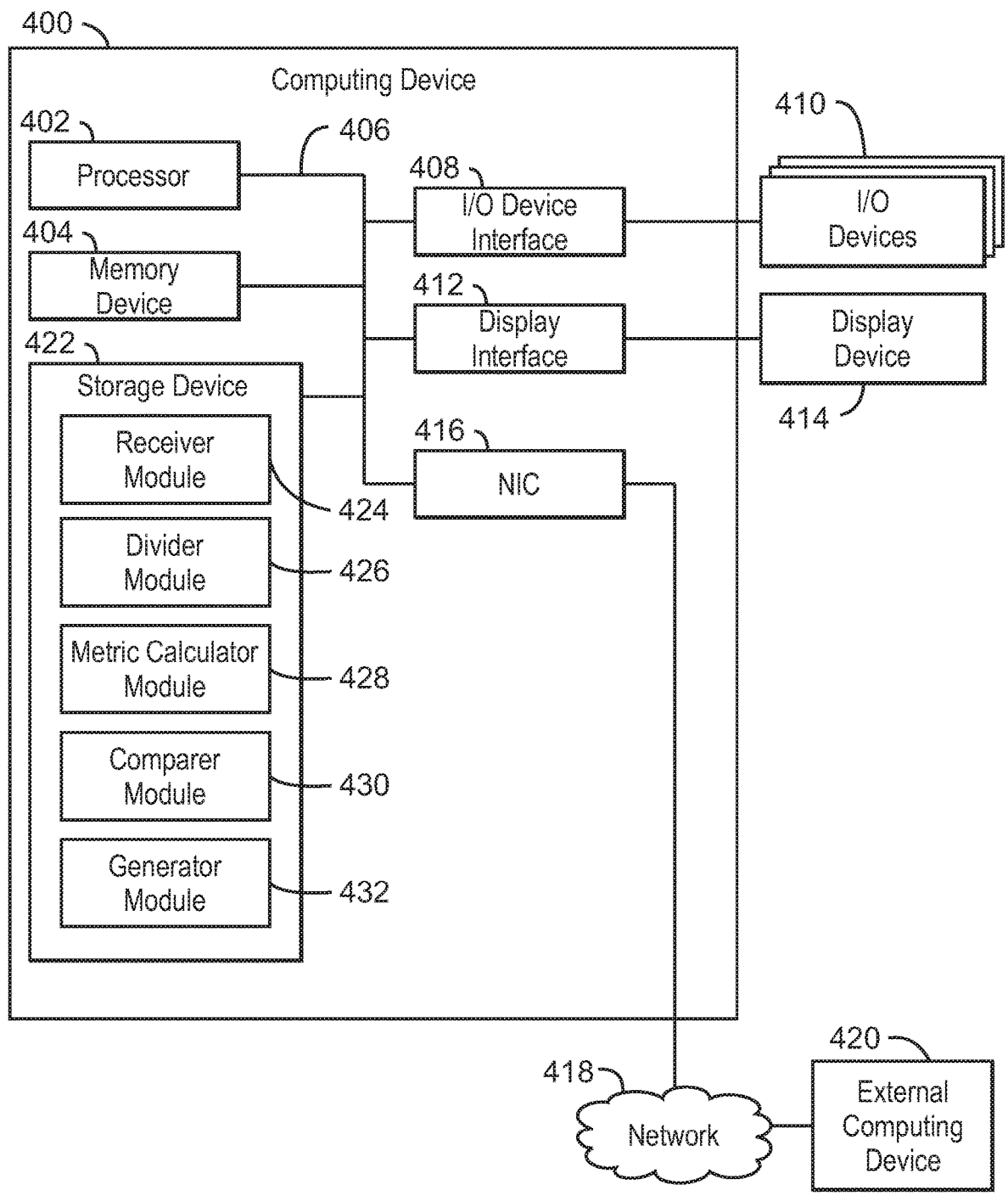
FIG. 4 is a block diagram of an example computing device that can identify security risks in code using a security metric comparison.

With reference now to FIG. 4, an example computing device can identify security risks in code using a security metric comparison. The computing device 400 may be for example, a server, a network device, desktop computer, laptop computer, tablet computer, or smartphone. In some examples, computing device 400 may be a cloud computing node. Computing device 400 may be described in the general context of computer system executable instructions, such as program modules, being executed by a computer system. Generally, program modules may include routines, programs, objects, components, logic, data structures, and so on that perform particular tasks or implement particular abstract data types. Computing device 400 may be practiced in distributed cloud computing environments where tasks are performed by remote processing devices that are linked through a communications network. In a distributed cloud computing environment, program modules may be located in both local and remote computer system storage media including memory storage devices.

The computing device 400 may include a processor 402 that is to execute stored instructions, a memory device 404 to provide temporary memory space for operations of said instructions during operation. The processor can be a single-core processor, multi-core processor, computing cluster, or any number of other configurations. The memory 404 can include random access memory (RAM), read only memory, flash memory, or any other suitable memory systems.

The processor 402 may be connected through a system interconnect 406 (e.g., PCI®, PCI-Express®, etc.) to an input/output (I/O) device interface 408 adapted to connect the computing device 400 to one or more I/O devices 410. The I/O devices 410 may include, for example, a keyboard and a pointing device, wherein the pointing device may include a touchpad or a touchscreen, among others. The I/O devices 410 may be built-in components of the computing device 400, or may be devices that are externally connected to the computing device 400.

The processor 402 may also be linked through the system interconnect 406 to a display interface 412 adapted to connect the computing device 400 to a display device 414. The display device 414 may include a display screen that is a built-in component of the computing device 400. The display device 414 may also include a computer monitor, television, or projector, among others, that is externally connected to the computing device 400. In addition, a network interface controller (NIC) 416 may be adapted to connect the computing device 400 through the system interconnect 406 to the network 418. In some embodiments, the NIC 416 can transmit data using any suitable interface or protocol, such as the internet small computer system interface, among others. The network 418 may be a cellular network, a radio network, a wide area network (WAN), a local area network (LAN), or the Internet, among others. An external computing device 420 may connect to the computing device 400 through the network 418. In some examples, external computing device 420 may be an external web-server 420. In some examples, external computing device 420 may be a cloud computing node.

The processor 402 may also be linked through the system interconnect 406 to a storage device 422 that can include a hard drive, an optical drive, a USB flash drive, an array of drives, or any combinations thereof. In some examples, the storage device may include a receiver module 424, a divider module 426, a metric calculator module 428, a comparer module 430, and a generator module 432. In some examples, one or more of the modules 424-436 may be implemented in an application or a service. The receiver module 424 can receive a source code and history information. The history information can include a version control history or a defect history, or a combination of the version control history and the defect history. For example, the version control history may include a list of all changes made to the source code. Likewise, the defect history may include a list of previously discovered defects in the source that may have already been fixed. The divider module 426 can then divide the source code into security-related components and security-non-related components. In some examples, the divider module 426 can divide the source code into security-related components and security-non-related components based on one or more static detectors of known vulnerabilities. For example, a code element that includes a known vulnerability can be marked as a security-related component. In some examples, the divider module 426 can divide the source code into security-related components and security-non-related components based on a received list of security-related code areas to be marked as security-related components. In some examples, the divider module 426 can divide the source code into security-related components and security-non-related components based on the defect history. For example, a code element corresponding to a security-related defect can be marked as a security-related component and a code element modified to fix a security-related defects is to be marked as a security-related component. In some examples, the divider module 426 can divide the source code into security-related components and security-non-related components based on an affected components analysis. For example, a code element that is related to a security-related component according to a data flow, a control flow, or a joint changes history, can be marked as a security-related component. The metric calculator module 428 can calculate security metrics for each of the security-related components and each of the security-non-related components based on the history information. For example, the security metrics can include a quantity of security-related defects, a quantity of defects, or a quantity of code changes. In some examples, the security metrics can be weighted based on defect severity, change size, complexity. The comparer module 430 can compare the security metrics of the security-related components with the security metrics of the security-non-related components. The generator module 432 can generate a visual representation comprising a highlighted area of concern based on the comparison.

It is to be understood that the block diagram of FIG. 4 is not intended to indicate that the computing device 400 is to include all of the components shown in FIG. 4. Rather, the computing device 400 can include fewer or additional components not illustrated in FIG. 4 (e.g., additional memory components, embedded controllers, modules, additional network interfaces, etc.). Furthermore, any of the functionalities of the receiver module 424, the divider module 426, the metric calculator module 428, the comparer module 430, and the generator module 432, may be partially, or entirely, implemented in hardware and/or in the processor 402. For example, the functionality may be implemented with an application specific integrated circuit, logic implemented in an embedded controller, or in logic implemented in the processor 402, among others. In some embodiments, the functionalities of the receiver module 424, the divider module 426, the metric calculator module 428, the comparer module 430, and the generator module 432, can be implemented with logic, wherein the logic, as referred to herein, can include any suitable hardware (e.g., a processor, among others), software (e.g., an application, among others), firmware, or any suitable combination of hardware, software, and firmware.

Figure 5:
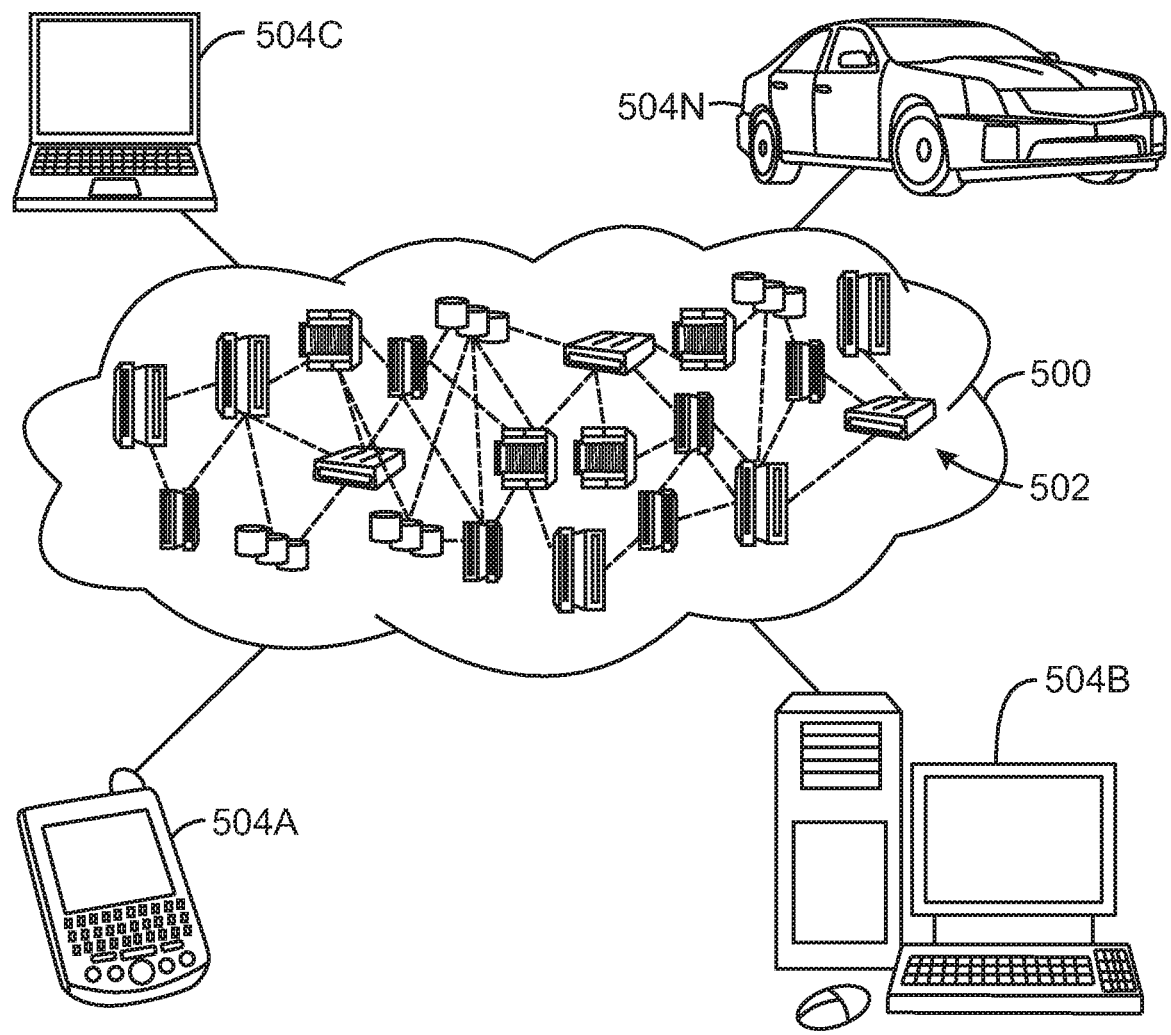
FIG. 5 is a block diagram of an example cloud computing environment according to embodiments described herein.

Referring now to FIG. 5, an illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
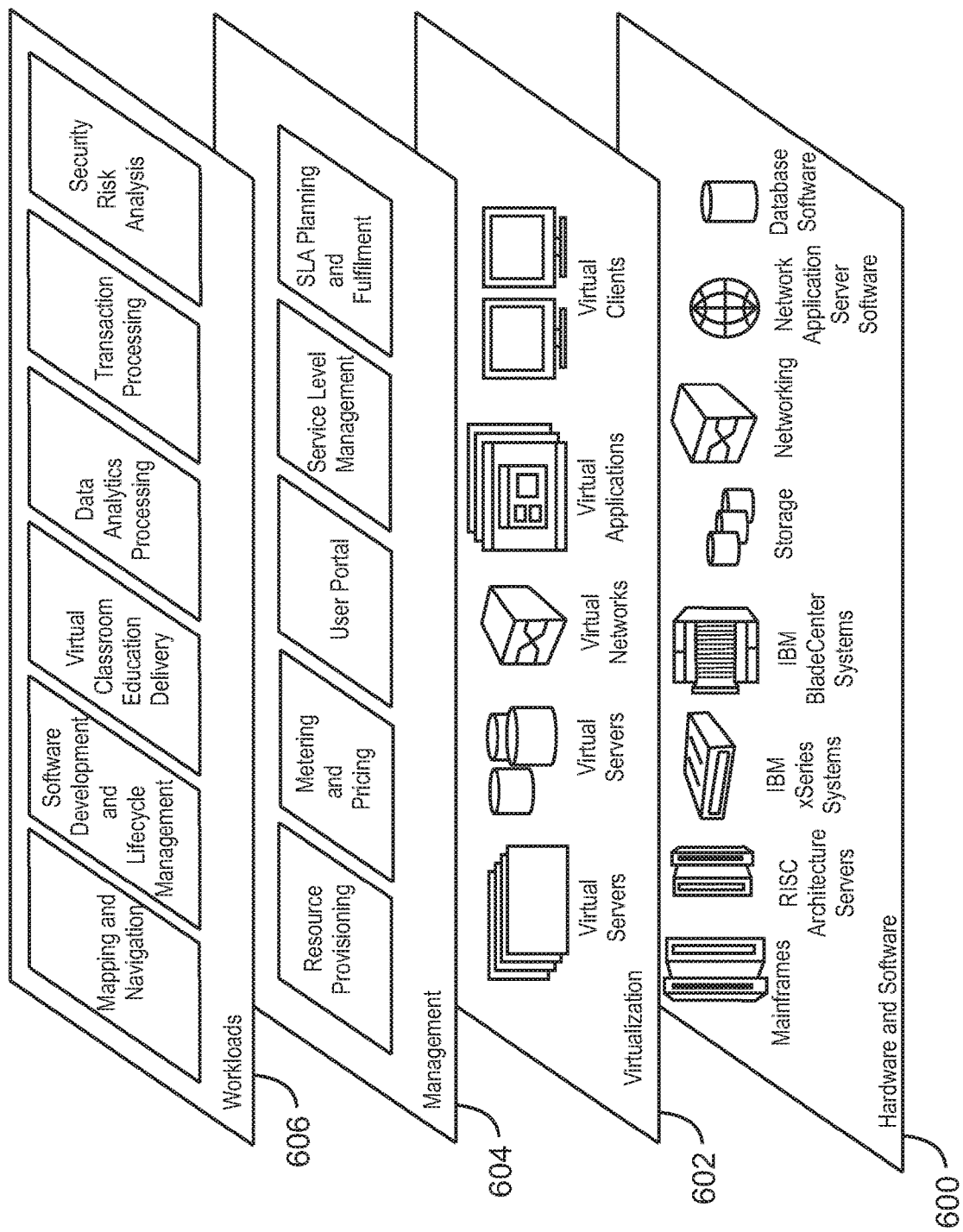
FIG. 6 is an example abstraction model layers according to embodiments described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and security risk analysis.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
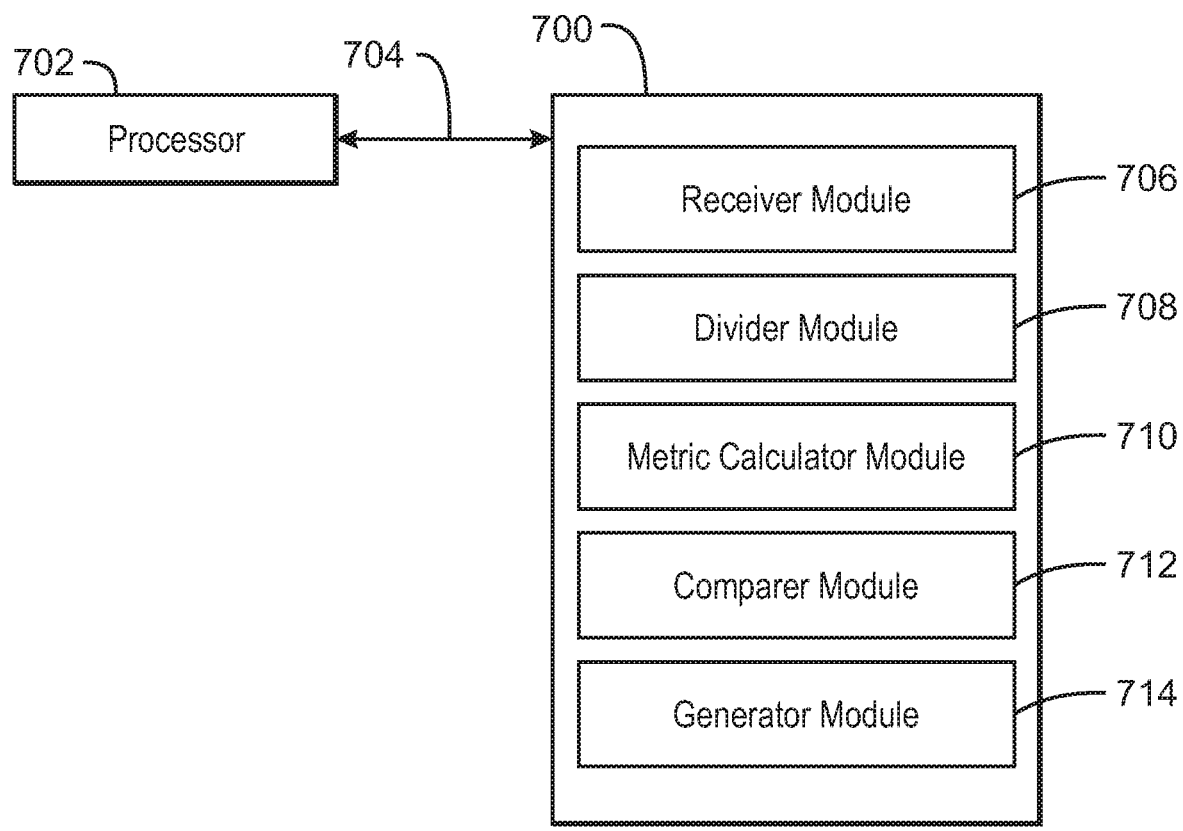
FIG. 7 is an example tangible, non-transitory computer-readable medium that can identify security risks in code.

Referring now to FIG. 7, a block diagram is depicted of an example tangible, non-transitory computer-readable medium 700 that can identify security risks in code. The tangible, non-transitory, computer-readable medium 700 may be accessed by a processor 702 over a computer interconnect 704. Furthermore, the tangible, non-transitory, computer-readable medium 700 may include code to direct the processor 702 to perform the operations of the method 300 of FIG. 3 above.

The various software components discussed herein may be stored on the tangible, non-transitory, computer-readable medium 700, as indicated in FIG. 7. For example, a receiver module 706 includes code to receive a source code, and a version control history and a defect history. For example, the version control history may include a list of changes made to the source code. In some examples, the defect history may include a list of defects previously detected and fixed in the source code. A divider module 708 includes code to divide the source code into security-related components and security-non-related components. In some examples, the divider module 708 may include code to divide the source code into security-related components and security-non-related components based on one or more static detectors of known vulnerabilities. For example, the divider module 708 can mark a code element that includes a known vulnerability as a security-related component. In some examples, the divider module 708 may include code to divide the source code into security-related components and security-non-related components based on a received list of security-related code areas to be marked as security-related components. In some examples, the divider module 708 may include code to divide the source code into security-related components and security-non-related components based on the defect history. For example, the divider module 708 can mark a code element corresponding to a security-related defect as a security-related component or mark a code element modified to fix a security-related defects as a security-related component. In some examples, the divider module 708 may include code to divide the source code into security-related components and security-non-related components based on an affected components analysis. For example, the divider module 708 can mark a code element that is related to a security-related component as a security-related component according to a data flow, a control flow, or a joint changes history. A metric calculator module 710 includes code to calculate security metrics for each of the security-related components and each of the security-non-related components based on the version control history and the defect history. A comparer module 712 includes code to compare the security metrics of the security-related components with the security metrics of the security-non-related components. A generator module 714 includes code to generate a visual representation comprising a highlighted area of concern based on the comparison. It is to be understood that any number of additional software components not shown in FIG. 7 may be included within the tangible, non-transitory, computer-readable medium 700, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a hardware processor to:
   receive a source code and history information, wherein the history information comprises a version control history or a defect history, or a combination of the version control history and the defect history;
   divide the source code into security-related components and security-non-related components;

calculate security metrics for each of the security-related components and each of the security-non-related components based on the history information, wherein the security metrics are calculated for each directory and function in the source code;

compare the security metrics of the security-related components with the security metrics of the security-non-related components based on the history information;

detect that a quantity of defects or modifications is larger in the security-related components than the security-non-related components;

generate, in response to detecting that the quantity of defects or modifications is larger in the security-related components than the security-non-related components, a recommendation for a review of quality controls in security code, a review of security skills in a security development team, a change of management processes for the security code, or an increased review of proposed security changes; and generate a visual representation comprising a plurality of interconnected blocks representing related changes to the source code and a highlighted area of concern based on the comparison, wherein a distance between two connected blocks indicates a strength of a relation between the two corresponding related changes to the source code.

2. The system of claim 1, wherein the security metrics comprise a quantity of security-related defects, the quantity of defects, the quantity of modifications, or any combination thereof.

3. The system of claim 1, wherein the security metrics are to be weighted based on defect severity, change size, complexity, or any combination thereof.

4. The system of claim 1, wherein the processor is to divide the source code into the security-related components and the security-non-related components based on one or more static detectors of known vulnerabilities, wherein a code element that comprises a known vulnerability is to be marked as a security-related component.

5. The system of claim 1, wherein the processor is to divide the source code into the security-related components and the security-non-related components based on a received list of security-related code areas to be marked as security-related components.

6. The system of claim 1, wherein the processor is to divide the source code into the security-related components and the security-non-related components based on the defect history, wherein a code element corresponding to a security-related defect is to be marked as a security-related component and a code element modified to fix a security-related defect is to be marked as a security-related component.

7. The system of claim 1, wherein the processor is to divide the source code into the security-related components and the security-non-related components based on an affected components analysis, wherein a code element that is related to a security-related component according to a data flow, a control flow, or a joint changes history, is to also be marked as a security-related component.

8. The system of claim 1, wherein the visual representation comprises control and data flow information represented in the visual representation as a chain of relationships between a set of higher risk changes.

9. A computer-implemented method, comprising:
receiving, via a processor, a source code and history information, wherein the history information comprises a version control history or a defect history, or a combination of the version control history and the defect history;

dividing, via the processor, the source code into security-related components and security-non-related components;

calculating, via the processor, security metrics for each of the security-related components and each of the security-non-related components based on the history information, wherein the security metrics are calculated for each directory and function in the source code;

comparing, via the processor, the security metrics of the security-related components with the security metrics of the security-non-related components;

detecting, via the processor, that a quantity of defects or modifications is larger in the security-related components than the security-non-related components;

generating, via the processor, in response to detecting that a quantity of defects or modifications is larger in the security-related components than the security-non-related components, a recommendation for a review of quality controls in security code, a review of security skills in a security development team, a change of management processes for security code, or an increased review of proposed security changes; and generating, via the processor, a visual representation comprising a plurality of interconnected blocks representing related changes to the source code and a highlighted area of concern based on the comparison, wherein a distance between two connected blocks indicates a strength of a relation between the two corresponding related changes to the source code.

10. The computer-implemented method of claim 9, wherein dividing the source code into the security-related components and the security-non-related components comprises marking a code element that comprises a known vulnerability as a security-related component.

11. The computer-implemented method of claim 9, wherein dividing the source code into the security-related components and the security-non-related components comprises marking code elements corresponding to a received list of security-related code areas as security-related components.

12. The computer-implemented method of claim 9, wherein dividing the source code into the security-related components and the security-non-related components comprises marking a code element corresponding to a security-related defect as a security-related component and marking a code element modified to fix a security-related defects as a security-related component.

13. The computer-implemented method of claim 9, wherein dividing the source code into the security-related components and the security-non-related components comprises marking a code element that is related to a security-related component as a security-related component according to a data flow, a control flow, or a joint changes history.

14. The computer-implemented method of claim 9, comprising, in response to detecting that a threshold number of security defects is exceeded at the security-non-related components, recommending increased security skill training for the security-non-related components, increased or improved security testing, increased or improved security source code scanning, tool improvements, or any combination thereof.

15. A computer program product for identifying security risks in code, the computer program product comprising a computer-readable storage medium having program code embodied therewith, wherein the computer readable storage medium is not a transitory signal per se, the program code executable by a processor to cause the processor to:

receive a source code, a version control history, and a defect history;

divide the source code into security-related components and security-non-related components;

calculate security metrics for each of the security-related components and each of the security-non-related components based on the version control history and the defect history, wherein the security metrics are calculated for each directory and function in the source code;

compare the security metrics of the security-related components with the security metrics of the security-non-related components;

detect that a quantity of defects or modifications is larger in the security-related components than the security-non-related components;

generate, in response to detecting that a quantity of defects or modifications is larger in the security-related components than the security-non-related components, a recommendation for a review of quality controls in security code, a review of security skills in a security development team, a change of management processes for security code, or an increased review of proposed security changes; and generate a visual representation comprising a plurality of interconnected blocks representing related changes to the source code and a highlighted area of concern based on the comparison, wherein a distance between two connected blocks indicates a strength of a relation between the two corresponding related changes to the source code.

16. The computer program product of claim 15, comprising program code executable by the processor to weight the security metrics based on defect severity, change size, complexity, or any combination thereof.

17. The computer program product of claim 15, comprising program code executable by the processor to divide the source code into the security-related components and the security-non-related components based on one or more static detectors of known vulnerabilities.

18. The computer program product of claim 15, comprising program code executable by the processor to divide the source code into the security-related components and the security-non-related components based on a received list of security-related code areas to be marked as security-related components.

19. The computer program product of claim 15, comprising program code executable by the processor to divide the source code into the security-related components and the security-non-related components based on the defect history.

20. The computer program product of claim 15, comprising program code executable by the processor to divide the source code into the security-related components and the security-non-related components based on an affected components analysis.

\* \* \* \* \*